United States Patent [19]

Macosko et al.

[11] Patent Number: 4,990,293
[45] Date of Patent: Feb. 5, 1991

[54] PROCESS OF AND APPARATUS FOR EXTRUDING A REACTIVE POLYMER MIXTURE

[75] Inventors: Christopher W. Macosko, Minneapolis; Thierry G. Charbonneaux, New Brighton, both of Minn.; Kirk J. Mikkelsen, Piscataway, N.J.

[73] Assignee: Regents of the University of Minnesota, St. Paul, Minn.

[21] Appl. No.: 118,717

[22] Filed: Nov. 9, 1987

[51] Int. Cl.[5] ................... B29C 47/04; B29C 47/92
[52] U.S. Cl. ........................................... 264/40.1; 73/3;
  73/55; 73/56; 73/168; 264/171; 264/176.1;
  264/211.24; 264/240; 264/328.6; 264/331.19;
  425/113; 425/149; 425/192 R; 425/382.4;
  425/461; 425/464
[58] Field of Search ............... 264/40.1, 171, 176.1,
  264/211.24, 240, 328.6, 331.19; 425/113, 149,
  192 R, 382.4, 461, 464; 73/3, 55, 56, 168

[56] References Cited

U.S. PATENT DOCUMENTS

| 2,734,224 | 2/1956 | Winstead | 425/461 X |
| 3,343,215 | 9/1967 | Vinkeloe | 425/467 |
| 3,382,535 | 5/1968 | Ferrari | 425/461 |
| 3,591,674 | 7/1971 | Engel | 264/209.6 |
| 3,825,645 | 7/1974 | Fayet | 425/461 X |
| 4,017,240 | 4/1977 | Nelson | 425/192 R |
| 4,470,789 | 9/1984 | Whittington et al. | 425/192 R |
| 4,534,003 | 8/1985 | Manzione | 364/476 |

FOREIGN PATENT DOCUMENTS

| 40672 | 12/1981 | European Pat. Off. | 264/176.1 |
| 2847627 | 7/1979 | Fed. Rep. of Germany | 425/463 |
| 2495053 | 6/1982 | France | 425/461 |
| 58-187314 | 11/1983 | Japan | 264/176.1 |
| 58-209529 | 12/1983 | Japan | 425/461 |
| 59-194819 | 11/1984 | Japan | 425/461 |

OTHER PUBLICATIONS

Lee, L. J. et al., "Impingement Mixing in Reaction Injection Molding" Polymer Engineering and Science, vol. 20, No. 13, (Sep., 1980) pp. 868-874.

Primary Examiner—Jeffery Thurlow
Assistant Examiner—Leo B. Tentoni
Attorney, Agent, or Firm—Faegre & Benson

[57] ABSTRACT

An extrusion die is described for extruding a polymer from a reactive precursor mixture without plugging of the die. The extrusion die includes a die inlet leading to at least one channel having dimensions which produce a wall shear stress value that exceeds the critical wall shear stress value for the particular reactive precursor mixture to prevent occlusion of the die. The preferred configuration of the die channels is a tree-like structure to obtain a coating width which is greater than the dimensions of the individual channels. Other features of the invention include a method for determining the critical wall shear stress value and a method for extruding reactive precursor mixtures.

35 Claims, 4 Drawing Sheets

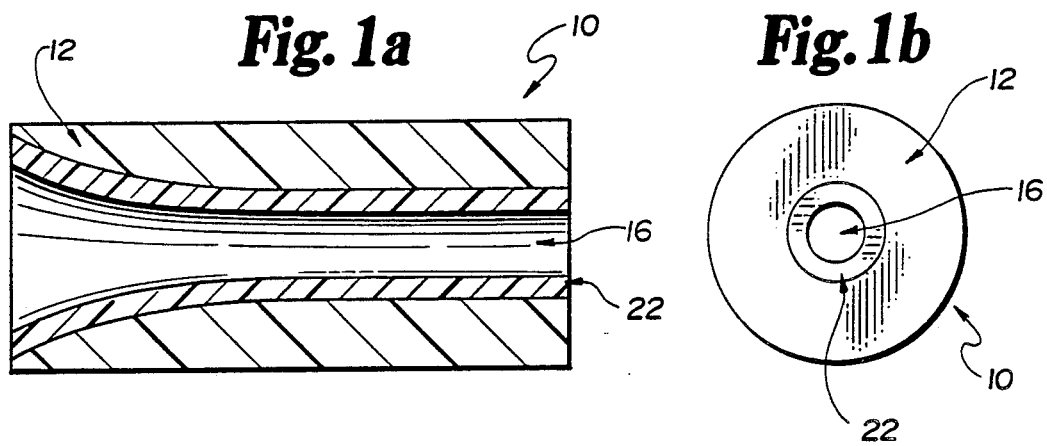
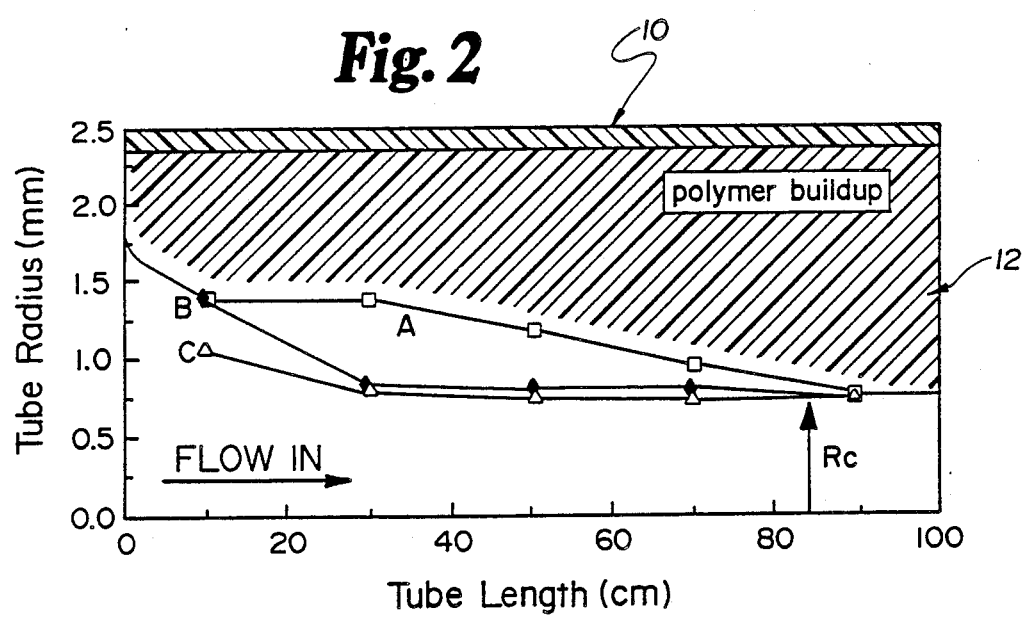
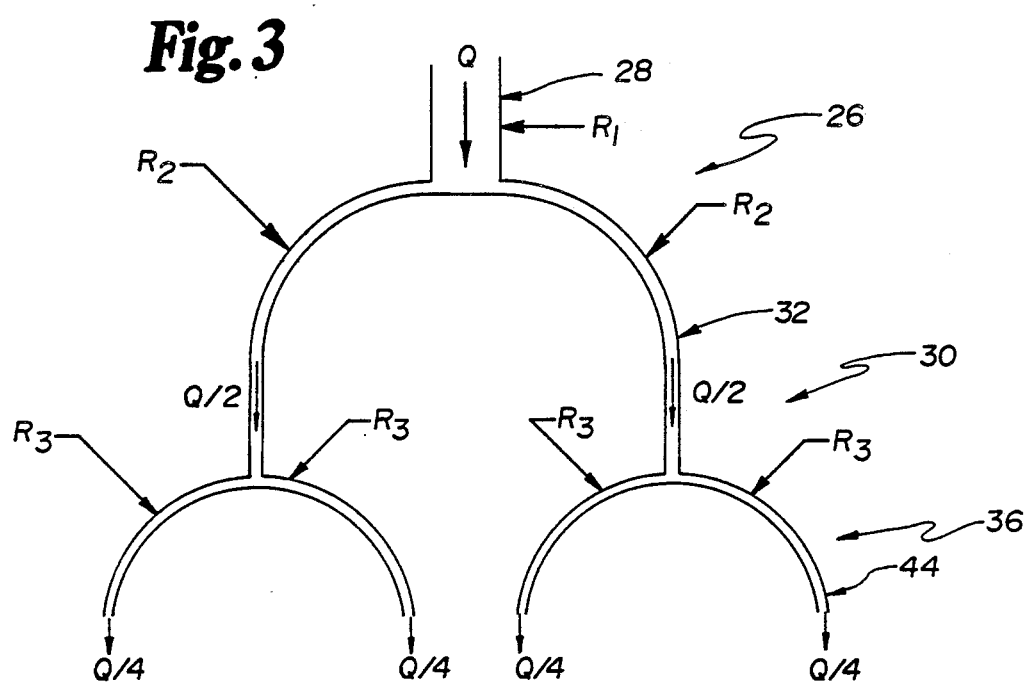

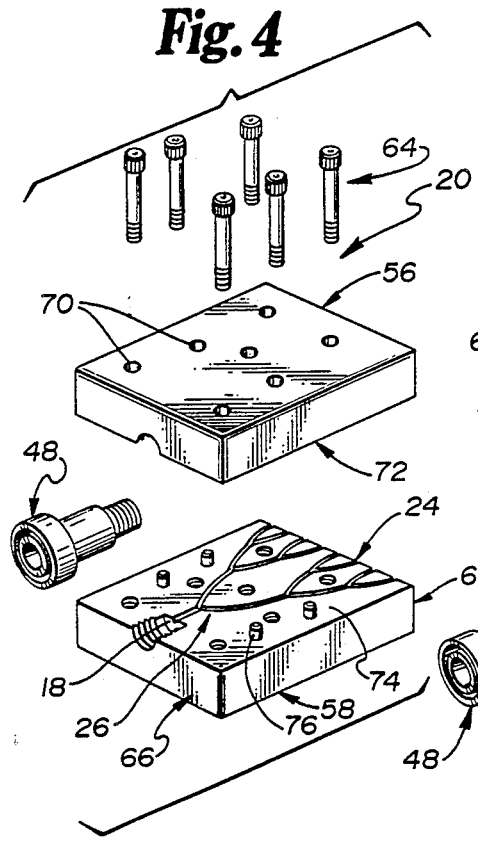
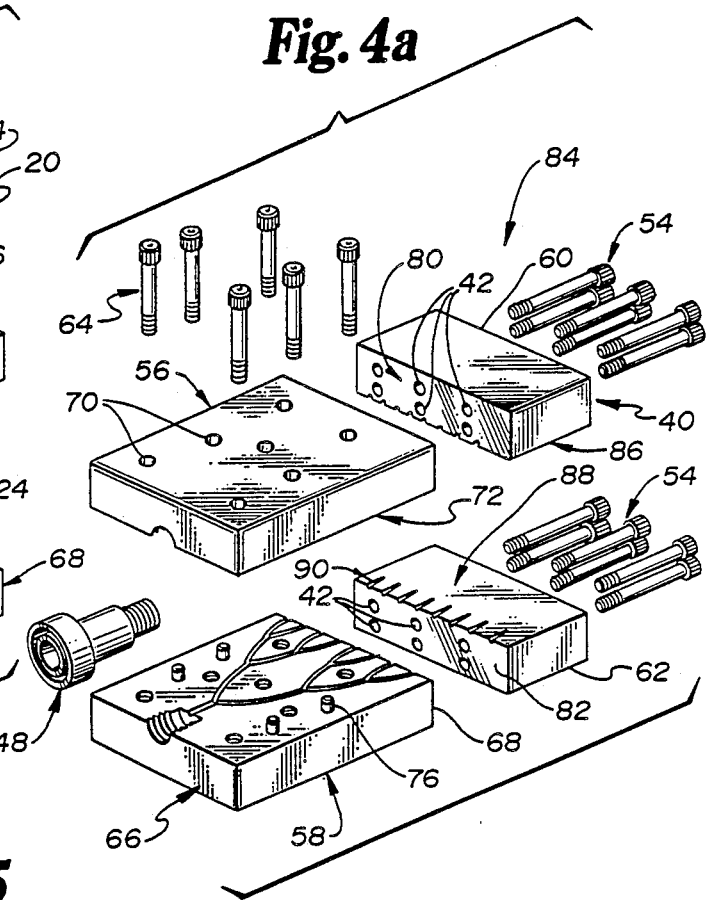
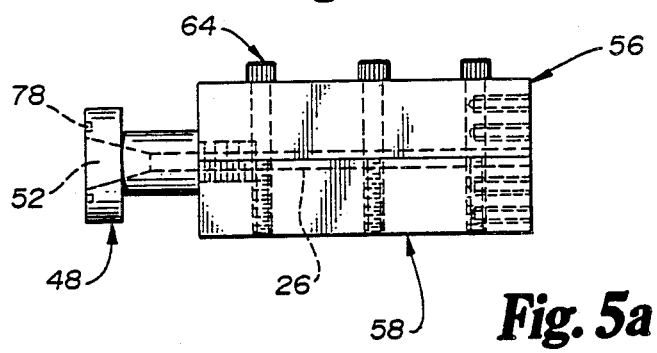
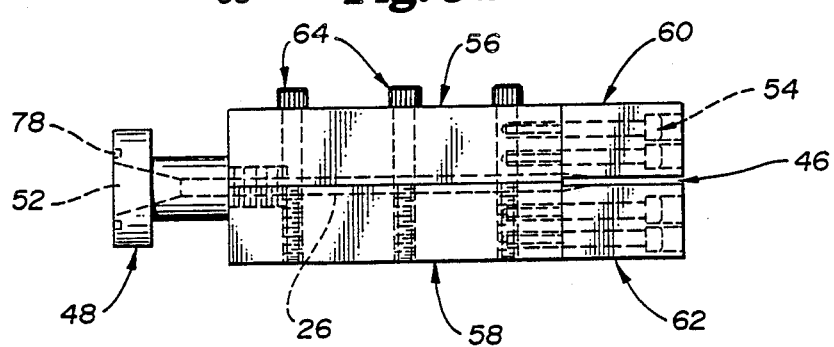

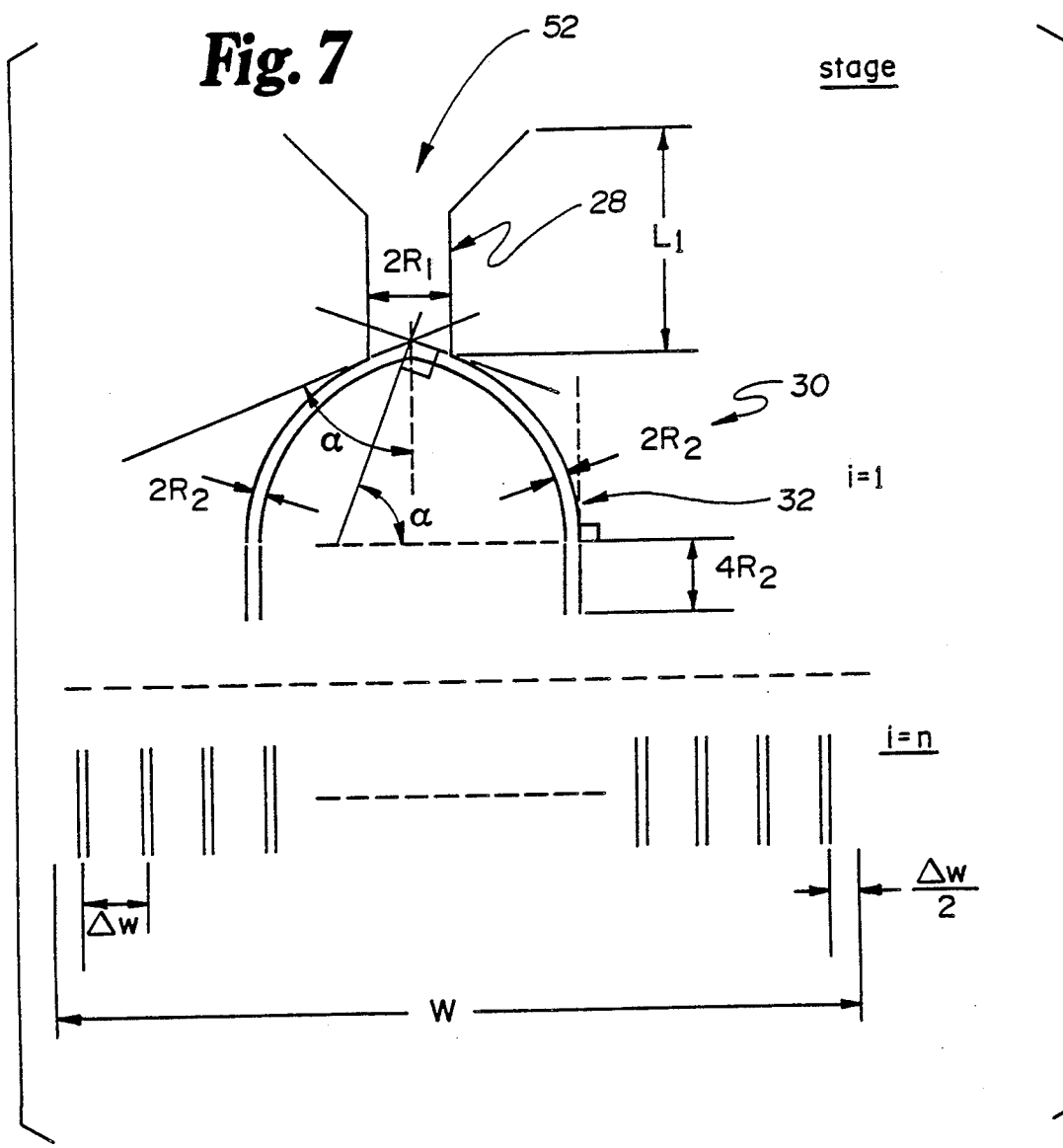
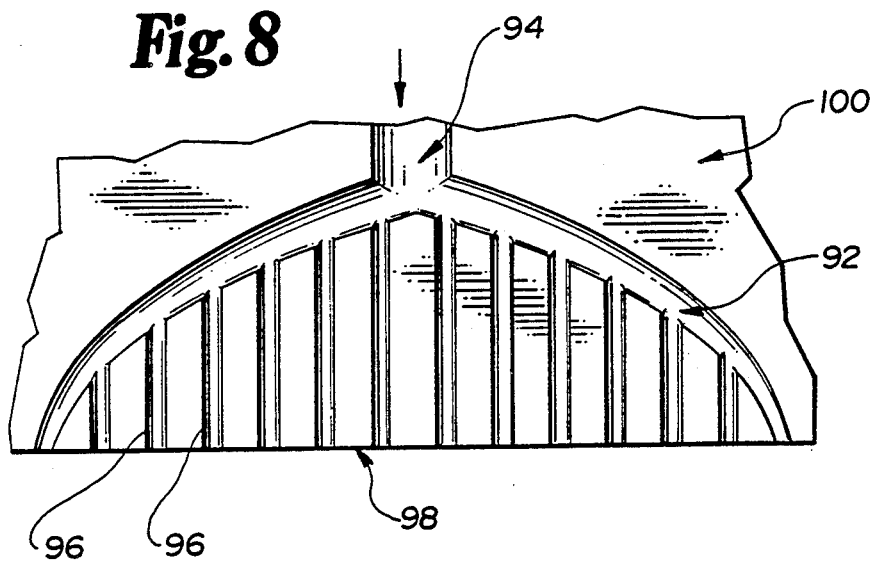

PROCESS OF AND APPARATUS FOR EXTRUDING A REACTIVE POLYMER MIXTURE

FIELD OF THE INVENTION

This invention relates generally to extrusion dies. More particularly, this invention relates to extrusion dies for producing polymers in the form of flat sheets or films from premixed reactive precursor mixtures for deposit on a substrate. In addition this invention concerns a method for determining a critical wall shear stress value associated with a particular reactive precursor mixture and using this critical wall shear stress value to determine the necessary dimensions of the various flow passageways for this mixture through the extrusion die.

BACKGROUND OF THE INVENTION

Manufacturing operations for the production of most polymers generally involve two main steps. The first step involves polymerization of the required starting materials to form the desired polymer. This step may be carried out in either a homogeneous system, that is bulk or solution polymerization, or in a heterogeneous system, that is suspension or emulsion polymerization. The second step in the manufacturing operation involves processing of the formed polymer for further shaping operations such as sheet formation, molding or extrusion. Reactive processing combines these two separate steps of polymer manufacture into a single step involving both polymerization and shaping of a premixed reactive precursor mixture. In this reactive processing procedure, the reactive mixture polymerizes and forms the desired product without further curing or shaping steps.

For example, to eliminate high drying costs and problems with solvent pollution, the coating industry has begun producing coatings by employing a mixture of monomer and polymer with subsequent heat or radiation polymerization of the monomer. However, these thermal and radiation steps are still expensive and add considerably to the physical size of the continuous coating operation. A viable alternative to thermal and radiation initiated polymerization involves mixing reactive precursor systems. In these reactive systems comprising monomers, oligomers, or mixtures thereof, polymerization commences when the individual components are brought into contact during mixing just prior to the point of coating. This eliminates the need for subsequent curing steps.

While premixing these activated systems can eliminate or reduce the need for high energy consuming curing steps and reduce the physical size of apparatus necessary for this coating process, premixed reactive precursor mixtures tend to build viscosity rapidly as they polymerize. The presence of solid die surfaces also causes shear flow leading to varying extents of reaction of these precursor mixtures and high viscosity gradients across any die cross section. When using premixed reactive precursor mixtures, these factors contribute to the formation of a layer of gelled polymer on the die walls. This gel layer forms a new surface boundary for the flow of the reactive precursor mixture on which more gel will continue to build upon. Ultimately, this continuously building gelled layer results in die plugging. Symptoms indicating this plugging phenomenon include a progressive increase in the pressure needed to drive the reactive precursor mixture flow at a constant flow rate through the die, a dimensionally reduced extruded product and the necessity to stop the extrusion process periodically for die cleaning.

Although a wide variety of extrusion dies are currently available, they uniformly fail to alleviate the specific problems mentioned above associated with the extrusion of polymers from premixed reactive precursor mixtures. Available articles illustrate this plugging problem. For example, reference can be had to: "Laminar Flow of a Thermosetting Polymer Through a Coat Hanger Die", 4 *Polymer Process Engineering.* No. 2-4, pp 151-171 (1986); "Laminar Tube Flow with a Thermosetting Polymerization", 28 AICHE Journal No. 6, pp 973-980 (Nov. 1982).

SUMMARY OF THE INVENTION

We have now discovered a design for a new extrusion die which permits the continuous production of polymer in the form of flat sheets and films from premixed reactive precursor mixtures without causing the die to plug. The premixed reactive precursor mixtures used in this invention are generally crosslinking precursor mixtures, the crosslinks being either of a chemical or physical nature. However, the precursors do not have to be crosslinkable to operate in the die.

A controlling principle for the design of this new extrusion die recognizes that a flowing premixed reactive precursor mixture exerts a certain wall shear stress on the channels within the die. It is a specific discovery of these inventors that the experimentally determinable ratio between wall shear stress and the radius of the channel can be used to avoid die plugging. That is, that there is an experimentally determinable critical radius of the die channel at which the value of the wall shear stress is such as to avoid occlusion of the die channels from gel buildup and permit free flow of the premixed reactive precursor mixture therethrough. Thus, if the radius of the die channel produces a wall shear stress for the reactive precursor mixture which exceeds the critical wall shear stress value found at the critical radius, there is generally no plugging of the die.

This critical radius—critical wall shear stress relationship is generally dependent on the particular chemical composition of the premixed reactive precursor mixture. Therefore, in designing an extrusion die suitable for the extrusion of polymer from a premixed reactive precursor mixture, it is generally necessary to first determine the critical radius value and the critical wall shear stress value for the particular reactive mixture. Other characteristics of the extrusion die of this invention include a very brief residence time of the reactive precursor mixture in the die, and a small number of areas of low shear stress, i.e. near stagnant materials. All of these characteristics reduce the likelihood of die plugging or occlusion of any of the passageways within the die.

Briefly, the extrusion die of the present invention comprises a die inlet for receiving a flow of the premixed reactive precursor mixture; at least one channel in flow communication with the inlet for conducting the flow of the reactive precursor mixture through the die, the dimensions of the channel producing a wall shear stress value which exceeds the experimentally determined critical wall shear stress value for the reactive precursor mixture and a die extrusion outlet for extruding a polymer of the reactive precursor mixture. The method of determining the critical wall shear stress value and the critical channel radius is also a feature of the present invention and will be described in greater detail further herein. The extrusion die of this invention design employing the determination of the critical wall shear stress associated with a particular reactive precursor mixture functions effectively for long periods of time, avoiding occlusion of the die, and maintaining flow of the premixed reactive precursor mixture through the die. The die also minimizes the physical length of the process, thereby minimizing costs.

Further, an extrusion die according to the present invention may consist of two portions: a spreader section and a slit section. The spreader section is composed of a series of channels which form a tree-like structure. At each branch stage of the tree structure the dimensions of the branch channels decrease to compensate for the decreasing flow rate of the mixture such that the dimensions of the branch channels continue to produce a wall shear stress value that exceeds the critical wall shear stress value for the reactive precursor mixture. Other significant features of this die design include appropriate arc lengths and splitting angles of the branch channels from the preceding branch channel to minimize areas of stagnant mixture flow, all of which features are designed to insure a continuing flow, all of which will be further described subsequently herein.

The extrusion die of the present invention may be formed with a second portion designed as a detachable slit section. The purpose of this section is to smooth out the flow of the reactive precursor mixture streams as they emerge from the branch channels of the spreader section. This slit section also functions to provide a sufficient level of back pressure to induce the collapse of possible gas bubbles that may be dissolved in the mixture prior to the produced polymer coating emerging from the die.

An extrusion die of this design allows for the continuous production of polymer in the form of flat sheets and films for deposit onto a substrate directly from a premixed reactive precursor mixture. Polymer extrusion using this die avoids the need for expensive thermal and radiation polymerization steps. The die also generally evidences the absence of the plugging phenomenon which occurs with the attempted extrusion of reactive precursor mixtures through currently available dies. Other advantages of the invention will become apparent to those skilled in the art from the following detailed description of the preferred embodiment when considered in conjunction with the accompanying drawings.

BRIEF DESCRIPTION OF THE DRAWINGS

FIG. 1a is a simplified cross-sectional diagram of a cylindrical calibrating die used for determining the critical radius value;

FIG. 1b is an end view of the diagram of FIG. 1a;

FIG. 2 is a graph of tube radius versus tube length over time for determining the critical radius associated with a particular premixed reactive precursor mixture using the cylindrical calibrating die of FIG. 1a;

FIG. 3 is a line form diagram of a tree-like structure of a spreader section of an extrusion die of the present invention;

FIG. 4 is an exploded view of an extrusion die of the present invention;

FIG. 4a is an exploded view of an extrusion die of the present invention with slit section attached;

FIG. 5 is a simplified, left side elevational view of the assembly of FIG. 4;

FIG. 5a is a simplified, left side elevational view of the assembly of FIG. 4a;

FIG. 7 is a stage diagram of the extrusion die of FIG. 4a; and

FIG. 8 is a simplified diagram of an alternative form of the extrusion die.

DETAILED DESCRIPTION OF THE PREFERRED EMBODIMENT

Figure 6:
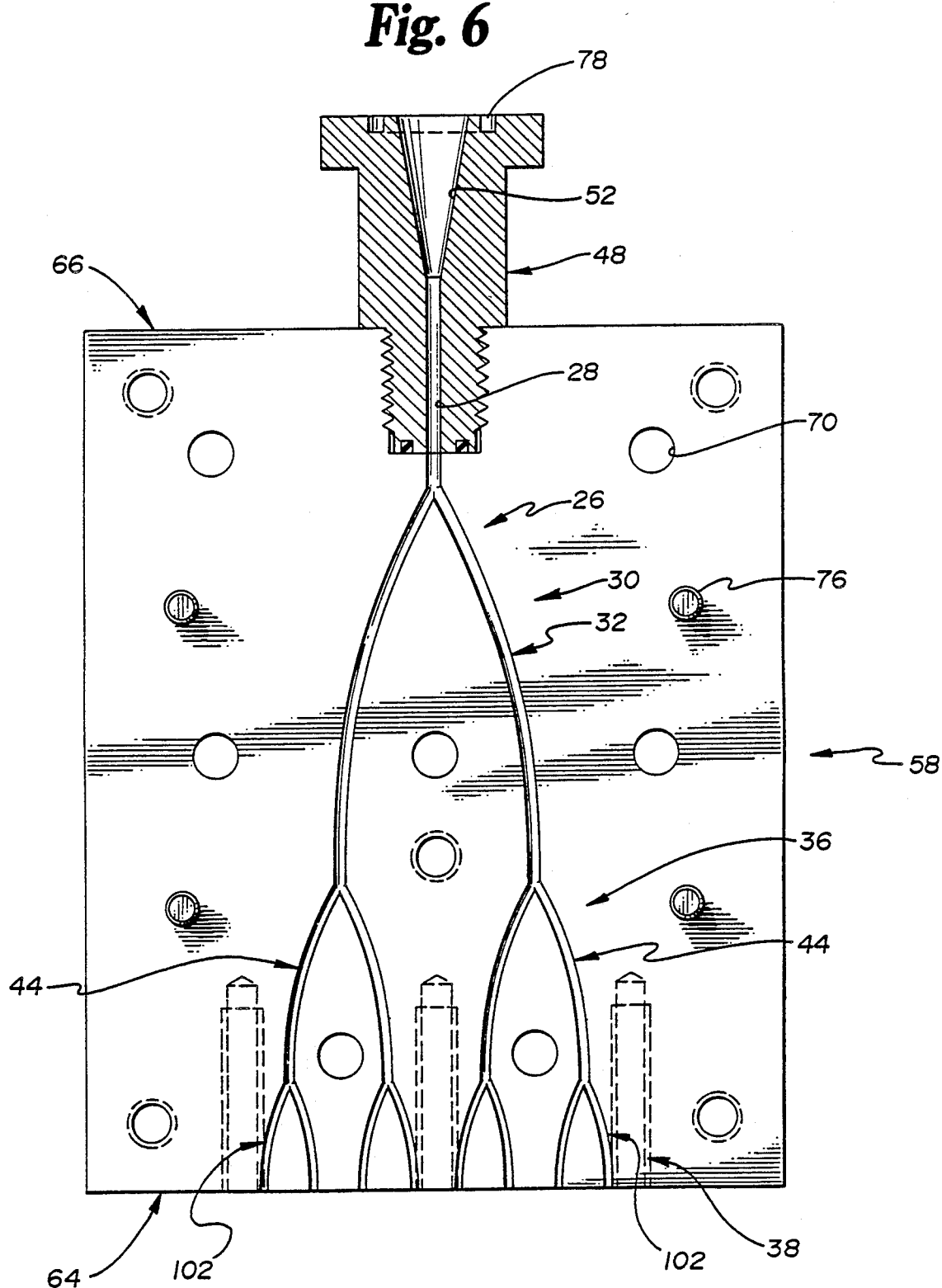
FIG. 6 is a bottom plan view of the upper spreader section and die inlet of FIG. 4 with parts broken away.

In designing an extrusion die for forming a polymer from a particular premixed reactive precursor mixture, the critical wall sheer stress value associated with the chosen reactive precursor mixture is first determined. Using high pressure turbulent mixing conditions, the required reactants for forming a particular polymer are admixed to form the premixed reactive precursor mixture. This mixture is introduced under continuous flow through a straight cylindrical calibrating die, that generally resembles a piece of stiff tubing. Preferably, reaction injection molding (RIM) impingement mixing and high pressure positive displacement pumps are used to maintain turbulent mixing conditions. The chosen mixer and pumps allow the discharge pressure to reach the desired constant flow rate; the requisite wall shear stress value as discussed further below and have adequate mixing of the components. Gelling is usually not a problem in the mixhead chamber of the RIM-type impingement mixing apparatus if impingement mixing is used because turbulent flow from the mixhead keeps the walls of the mixhead chamber clear. It should be noted that impingement mixing of the reactants is not mandatory. High shear static mixers present one of several available mixing alternatives for maintaining the required mixing conditions.

Referring now to the drawings, FIG. 1a shows a straight cylindrical calibrating die 10 used in determining the critical wall sheer stress value associated with a particular premixed reactive precursor mixture, referred to herein as the calibrating die. As a reactive precursor mixture is dispensed through the calibrating die, the mixture forms a layer of gel 12 on the die walls as it loses its ability to flow. This gel layer 12 on the die walls forms a new effective boundary for the reactive mixture flow on which an additional gel layer 22 can subsequently build. This phenomenon is due to the tendency of reactive precursor mixtures to build viscosity rapidly. The presence of solid die surfaces also causes shear flow leading to high gradients of extents of reaction and viscosity. FIG. 1b is a view in cross-section of the end of the calibrating die 10 of FIG. 1a depicting a narrowing passageway 16 as the gel 12, 22 accumulates on the die walls.

During the dispensing process, the pressure in the die is monitored over time to arrive at the critical radius and critical wall shear stress values. Initially, as the reactive precursor mixture is dispensed through the die the pressure increases rapidly due to the increasing viscosity of the polymerizinq mixture and the resulting decrease in the area available for flow as the gel accumulates on the die walls. (See FIG. 1b). At some point in time the pressure rise will slow, reflecting a planarization of the gel build up throughout the die. A steady state is then achieved at which the flow continues through the remaining narrowed passageway of the die with generally no further measurable gel buildup. The diameter of this narrowed passageway is measured to obtain the critical radius value associated with the particular premixed reactive precursor mixture. The pressure at which the critical radius is obtained corresponds to the critical wall shear stress value.

Alternatively, flow curves can be extrapolated to provide a crude measure of the critical wall shear stress value. This method involves plotting the pressures which result as the gel buildup occurs against time. This data can be extrapolated from the deflection point of the curve to approximate the pressure where a steady state would be achieved. This value approximately represents the critical wall shear stress value.

The graph of FIG. 2 illustrates the physical evolution of gel buildup 12 over the length of calibrating die 10 as a function of time, the different times being indicated by lines A, B and C. For simplicity, only the upper portion of the die 10 is depicted. As shown by line A, the dimensions of the narrowed passageway 16 are reached first near an outlet portion of the die 10. At times B and C, the gel builds toward the entrance to make the diameter of the passageway uniform throuqhout the tube. After the narrowed passageway 16 is formed, no further gel buildup is observed.

In view of these results, it appears that the narrowed passageway has a critical radius value, $R_c$, for the reactive precursor mixture where no further, measurable gel buildup occurs. The reactive precursor mixture exerts a critical wall shear stress at this critical radius to produce this effect. Generally, as the channel radius decreases the wall shear stress exerted by the traveling reactive precursor mixture increases. If the wall shear stress value exceeds the critical wall shear stress value, $\tau_c$, for the particular mixture, there will generally be no further gel build up and consequently no die plugging. This effect can be readily achieved by having a smaller radius for the die channel than the critical radius for the reactive precursor mixture. This phenomenon is shown in the formula:

$$\tau_i = \frac{4\eta Q}{\pi 2^{i-1} R_i^3} > \tau_c = \frac{4\eta Q}{\pi 2^{i-1} R_c^3}$$

where $\tau_i$ is the wall shear stress of the traveling reactive precursor mixture, $\eta$ is the viscosity of the reactive precursor mixture assuming no significant viscosity rise due to polymerization, Q is the total flow rate, $R_i$ is the chosen radius of the die channel, and $R_c$ is the critical radius for the reactive precursor mixture at the given flow rate and viscosity.

The existence of a critical wall shear stress value has been proven for reactive precursor mixtures of varying chemical compositions. Our experiments have shown that the precise value is dependent on the composition of the reactive precursor system employed. The following examples illustrate this dependency. Generally, the critical wall shear stress values for a crosslinking polyurethane precursor system lie between 3500 Pa and 10000 Pa.

Determination of Critical Radius and Critical Wall Shear Stress Values

EXAMPLE 1

A two component crosslinking polyurethane precursor system was continuously dispensed through a straight cylindrical calibrating die. This system consisted of 44% by weight uretonimine modified 4—4' diphenylmethanediisocyanate. This modified MDI is commercially available as LF-168 from ICI-Rubicon Corporation. Also present in the mixture was 56% by weight caprolactone based triol of an intermediate molecular weight of approximately 540 gm/mole. This polyol is commercially available under the name TONE-0305 from Union Carbide Corporation. Less than 0.1% by weight dibutyltindilaurate, premixed with the polyol component, was used to catalyze the reaction.

After approximately 15 minutes had elapsed a steady state flow was achieved in the cylindrical calibrating die. The critical radius of the remaining passageway was measured and found to be 0.79 mm. This radius value means that the critical wall shear stress value for this mixture was approximately 8500 Pa. FIG. 2 illustrates the evolution of gel buildup using this reactive precursor mixture.

EXAMPLE 2

A two component crosslinking polyurethane precursor system was continuously dispensed through a straight cylindrical calibrating die. This system consisted of 37% by weight uretonimine modified 4—4' diphenylmethanediisocyanate. This modified MDI is commercially available as LF-168 from ICI-Rubicon Corporation. Also present in the mixture was 63% by weight polypropyleneoxide triol having an approximate molecular weight of 700 gm/mole. This polyol is commercially available under the name NIAX LHT-240 from Union Carbide. Approximately 1% by weight of dibutyltindilaurate, premixed with the polyol component, was used to catalyze the reaction.

After approximately 10 minutes had elapsed, a steady state flow was achieved in the calibrating die. The critical radius of the remaining passageway was measured and found to be 0.7 mm. In turn, the critical wall shear stress value was approximately 4850 Pa.

EXAMPLE 3

Next, a two component crosslinking polyurea precursor system was investigated. 73% by weight of a triamine mixture was admixed with 27% by weight of an aliphatic diisocyanate. The triamines used are commercially available under the names Jeffamine T403 and Jeffamine T5000 from Texaco Corporation. They were premixed in the ratio of 0.712 gram of Jeffamine T403 per gram of Jeffamine T5000. The diisocyanate portion is commercially available as Desmodur W from Mobay Corporation. The critical wall shear stress value was determined by extrapolation of flow curves according to the method described hereinabove. The critical wall shear stress value as determined by this method is in the order of $10^5$ Pa.

In designing an extrusion die 14, various parameters must be established. The first step in the design procedure is to determine the flow rate, Q, at which the die is going to operate. Market and production considerations generally fix this figure. Thus, flow rate can be defined by the desired coating specifications, such that
Q=VHW
where H and W represent the desired coating's thickness and width respectively and V is the velocity of the substrate to be coated traveling relative to the die outlet. In addition, the flow rate must be such that Q falls between the maximum flow rate that the reactive precursor delivery system can furnish and the minimum flow rate necessary to obtain good mixing of the reactants.

Good mixing of the reactants is usually defined by the flow of the most viscous of the reactants in the mixture, usually the polyol in the case of impingement mixing. Generally, with impingement mixing good mixing is realized if the Reynolds number of the more viscous stream entering into the mixhead is greater than a critical Reynolds value $Re_c$ for the reactive precursor mixture. The following formula illustrates this relationship:

$$Re = \frac{4 Q_p \rho_p}{\pi D \eta_p} > Re_c$$

where the subscript p designates the more viscous component, $Q_p$ is the flow rate, $\eta$ is the viscosity, $\rho$ is the density of the more viscous component at the desired coating temperature, and D is the diameter of the orifice leading into the mixhead chamber.

The critical Reynolds number can be determined through techniques that are known to those skilled in the art as illustrated in "Impingement Mixing in Reaction Injection Molding", 20 *Polymer Engineering and Science*, No. 13, p 868–874 Sept. 1980). For crosslinking polyurethane precursor systems, the critical Reynolds number is usually found to be in the range of 250–300.

For coating a particular premixed reactive precursor mixture onto a substrate, the reacting material often must be distributed over a wide area, often much wider than can be accommodated by the critical channel radius of the extrusion die alone. To achieve this wide area of coverage, the preferred embodiment of the present invention applies the critical radius-critical wall shear stress relationship to an arrangement of channels resembling a tree-like structure 26. This tree structure 26 is shown in FIG. 3 in a schematic line form diagram. Q represents the flow rate of the reactive precursor mixture and the various "R's" indicate the radius values of the branches in the structure. Further discussion of this figure and the geometrical parameters of tree-like structure 26 is given below.

Referring now to FIG. 4, the extrusion die 14 of this invention is generally composed of a spreader means 20 having an upper spreader die member 56 and a lower spreader die member 58. The upper spreader die member 56 is preferably mounted on the lower spreader die member 58 by means of a plurality of clamping bolts 64 engaging clearance holes 70 so that the die can be readily opened for cleaning. Upper spreader die member 56 has an upper die face 72 while lower spreader die member 58 has a lower die face 74. Each spreader member bears approximately one-half of tree-like structure 26 on its die face 72, 74. When the spreader means are assembled so that upper die face 72 engages lower die face 74, the channels of tree-like structure 26 are formed. The engagement of the upper and lower spreader members 56 and 58 must be tight enough to completely form the channels so that leakage will not occur. Dowel pins 76 are preferably used to aid in aligning the halves of the tree structure channels. The spreader means 20 shown in FIG. 4 also has a die inlet 18 at a proximal spreader face 66 for receiving the reactive precursor mixture from the delivery system and an outlet means 24 for extruding the mixture at a discharge face 68.

Preferably, a connecting nozzle 48 is threadably connected to the die inlet 18 to connect the die to a reactive precursor mixture source. As shown in FIG. 5, an O-ring 78 ensures a tight seal between the nozzle and the mixture source. A second O-ring ensures a tight seal between the nozzle and the die. The connecting nozzle 48 has a funneling passageway 52 to provide a smooth transition from the reactive precursor mixture source to die inlet 18 for the traveling reactive precursor mixture. The structure of the connecting nozzle 48 is also illustrated more fully in FIG. 5. The precise dimensions of this funneling passageway 52 need not be defined by the critical wall shear stress-critical radius relationship discussed above. Rather, the turbulent flow of the traveling reactive precursor mixture from the reactive precursor mixture source prevents measurable gel buildup in the passageway.

FIG. 4a shows a preferred embodiment of the extrusion die of the present invention. As illustrated in FIG. 4a the die, generally referred to as 84, is composed of two sections. The first section is the spreader means 20 as generally referred to above in regard to the description of FIG. 4. The second section of the extrusion die 84 consists of a slit section 40. Slit section 40 is made up of an upper extrusion lip 60 attached to upper spreader die member 56 and a lower extrusion lip 62 attached to lower spreader die member 58 to create an extrusion slit gap 46. Specifically, upper and lower extrusion lips 60, 62 each have a land face 80, 82. Land faces 80, 82 of their respective extrusion lips engage the discharge face 68 of the spreader means 20. A plurality of land bolts 54, engaging clearance holes 42, are preferably used for mounting the upper and lower extrusion lips 60, 62 to the spreader means 20 so that slit sections of different configurations can be used interchangeably. The upper and lower extrusion lips 60, 62 also each have an upper extrusion face 86 and a lower extrusion face 88.

The reactive precursor mixture travels to these extrusion faces 86, 88 via a plurality of delivery tapers 90. The delivery tapers 90 are located on both the upper and lower extrusion lips 60, 62. When the slit section is mounted on the spreader section, these delivery tapers 90 are aligned with the branch channels of the last branch stage of the spreader section. The slit section 40 serves to smooth out the flow formed by the merging of the individual flows from tree structure 26 and to provide enough back pressure to induce the collapse of possible gas bubbles dissolved in the reactive precursor mixture before they reach the substrate. However, the slit section 40 is not always needed. The presence of the slit section 40 depends upon the particular characteristics of the coating to be produced. For example, the need is reduced significantly if the reactive precursor mixture has a long gel time and a low surface tension. The slit section may be formed to any desired length to accommodate the needs of the particular extrusion die and the particular premixed reactive precursor mixture.

FIG. 5 depicts the assembled extrusion die of FIG. 4. The upper spreader die member 56 tightly engages the lower spreader die member 58 by means of clamping bolts 64. The spreader die members 56, 58 are aligned so that the spreading branches of the tree-like structure are formed, the channels having a generally circular cross-section throughout. The connecting nozzle threadably engages the spreader means 20 with the die inlet 18 in communication with the funneling passageway 52.

FIG. 5a depicts the assembled extrusion die of FIG. 4a. The upper and lower extrusion lips 60, 62 of the chosen slit section 40 are bolted onto their respective spreader die members 56 and 58 to create an extrusion slit 46.

If a slit section is used, as illustrated in FIGS. 4a and 5a, the extrusion slit gap 46 is chosen such that the wall shear stress value, $\tau_{gap}$, exceeds the critical wall shear stress value for the reactive precursor mixture, $\tau_c$, so that the reactive precursor mixture does not accumulate in the slit gap. The following formula illustrates this parameter:

$$\tau_{gap} = \frac{6\eta Q}{W B_{gap}^2} > \tau_c = \frac{6\eta Q}{W B_c^2}$$

where
Q is the flow rate,
$\eta$ is the viscosity of the mixture assuming no significant polymerization,
W represents the desired coating width,
$B_{gap}$ is the vertical distance between the upper and lower extrusion lips 60, 62, and
$B_c$ is the critical height value for the reactive precursor mixture.

Generally $B_{gap}$ will be smaller than $B_c$ to obtain the requisite critical wall shear stress value.

Based on the relationship between critical wall shear stress and the critical radius numerous extrusion die designs can be constructed. The preferred embodiment employs this relationship in a tree-like structure 26 as shown in FIGS. 3 and 6. The tree-like structure 26 is made of a plurality of channels having a generally circular cross-section throughout. The tree 26 first has a central channel, or a main branch, 28 leading from the die inlet 18 where the reactive precursor mixture initially enters the tree configuration. A first branch stage, generally referred to as 30, has a plurality of branch channels 32 splitting from central channel 28. Preferably, two equal branch channels make up this first branch stage. Additional branch stages can also be used to obtain a wider coating. Our preferred embodiment has three branch stages. At both a second and a third branch stages 36, 38, respectively, a plurality of branch channels again split from the preceding branch channels to carry the flow over a wider portion of the die. As in the first branch stage 30, it is preferred that two branch channels split from each preceding channel of the prior branch stage. Thus, the second branch stage 36 is composed of four secondary branch channels 44 and the third branch stage 38 has eight tertiary branch channels 102. These branch channels cover the entire length of the spreader means 20 to the discharge face 68. The branch channels of the last branch stage, the third in the preferred embodiment will be in flow communication with the delivery tapers 90 of the slit section 40.

FIG. 7 shows more particularly, the dimensions of the tree structure. The splitting angle, $\alpha$, at which the flow splits into the branch channels at each branch stage can not be too large. If this angle is too large, the flow will change direction abruptly and create large areas of near stagnant material. On the other hand if the splitting angle is too small, an undesirable number of branch stages would be needed in order to reach a reasonable coating width. This would result in an excessive pressure drop through the die. Preferably, the splitting angle is approximately 30°. A range of potential splitting angles lies between 0 degrees and 60 degrees.

Besides the splitting angle, the length of the branch channels must be such that the flow of the reactive precursor mixture proceeds towards the outlet means 24 without the flow favoring any of the branch channels over any of the other branch channels in the same branch stage. Therefore, the arc length of each branch channel as it splits from the preceding channel is chosen such that the stream emerging from each channel flows toward the outlet means 24. Preferably, an additional section is added to insure this result when calculating the arc length of the main channel. This added section is assumed to be straight and two diameters long. With these conventions the arc length of each branch channel, assuming two branch channels, is:

$$L_i = 4 R_i + \alpha \frac{2^{n-i} \Delta w}{2(1 - \cos \alpha)}$$

where
$L_i$ represents the arc length,
$R_i$ is the radius of the branch channels at that branch stage,
$\alpha$ is the splitting angle,
n is the total number of stages in the tree-like structure,
i is the branch stage of the tree for which the arc length is being calculated, and
$\Delta w$ is the interval between two adjacent streams emerging from the spreader means.

FIG. 7 also shows that the width of the coating to be produced will depend on the number of stages in the tree structure and the distance between two adjacent streams emerging from the spreader means. The coating width, W can be determined from the formula:
$$W = 2^{n-1} \Delta w$$
where
n is the number of branch stages, and
$\Delta w$ is the distance interval discussed above.

It is a key discovery of the present invention that the dimensions of each branch channel in each branch stage be chosen so that the wall shear stress exceeds the critical wall shear stress value for the reactive polymer mixture. It will be noted by those skilled in the art that at each branch stage the flow rate in each branch channel will be lower than the flow rate in the preceding branch channels as FIG. 3 illustrates. In FIG. 3, the flow rate, Q, divides according to the number of branch channels in the succeeding branch stage. Thus, where there are two branch channels in the first branch stage, the flow rate divides in half (Q/2). At the second branch stage the flow rate is again divided in half so that the flow rate is now one fourth of what it was initially upon entering the die (Q/4). Subsequently, the dimensions of the branch channels in each succeeding branch stage will decrease to compensate for the lower flow rate and still produce a wall shear stress value that exceeds the critical wall shear stress value for the mixture. This relationship must hold true throughout the die to prevent die plugging.

Using the wall shear stress formula where $\tau_i > \tau_C$, the cubed radii of the branch channels of the preferred embodiment are as follows: $1.29 \times 10^{-5}$ inches$^3$ for the branch channels of the first branch stage; $0.38 \times 10^{-5}$ inches$^3$ for the secondary branch channels of the second branch stage; and $0.20 \times 10^{-5}$ inches$^3$ for the tertiary branch channels of the third branch stage. These numbers apply to the specific reactive precursor mixture discussed in Example 2 above, where n=60 cp and Q=28.3 cc/sec or to whatever continuation of viscosity and flow rate that yield a value that equals or exceeds this critical wall shear stress value.

When all of the design dimensions have been chosen, the final step is to check that the total pressure drop across the die is smaller than the maximum pressure head that the delivery system is able to provide. Thus:

$$\Delta P_{total} = \Delta P_{mixhead} + \Delta P_{spreader\ means} + \Delta P_{gap} < \Delta P_{machine\ limit}$$

where:

$$\Delta P_{gap} = \frac{12\eta\ Q\ L_{gap}}{W\ H_{gap}^3}$$

$$\Delta P_{impingement\ mixhead} = K_1 Q_p^2 + K_2 Q_p$$

$$\Delta P_{spreader\ section} = \frac{8\ \eta\ Q}{\pi} \sum_{i=1}^{n} \frac{L_i}{2^{i-1}\ R_i^4}$$

assuming that the reactive precursor mixture behaves like a Newtonian fluid, where $\eta$ equals the viscosity of the reactive mixture assuming no significant viscosity rise due to polymerization, Q represents flow rate, $L_{gap}$ equals the length of the slit section, W and $H_{gap}$ represent the coating width and slit gap respectively, $Q_p$ is the flow rate of the more viscous component of the mixture, $K_1$ and $K_2$ are constants which depend on mixhead dimensions and reactant properties. These constants are defined in the article "Design and Characterization of a Small Reaction Injection Molding Machine", 24 *SPE Antec Technical Papers* pp 151-153 (1978), which is specifically incorporated by reference in this application, $L_i$ is the arc length of the branch channels, $R_i$ is the radius of the branch channel, and i represents the branch stage number.

Many alternative designs can be made using these principles. For example the tree-like structure could consist of more than two branch channels splitting from the branch channels of the preceding branch stage. Also, the branch channels need not have a circular cross-section throughout. FIG. 8 shows that a coat hanger die 100 could also be modified to include a high number of generally straight channels. A main branch 94 for receiving the reactive precursor mixture is connected to a tapering distribution branch 92. The distribution branch 92 generally conforms to the external shape of the coat hanger die. A plurality of generally, straight discharge branches 96 communicate with the distribution branch, or manifold, 92 and lead to a discharge end 98. The dimensions of these distribution channels would permit the wall shear stress to exceed the critical wall shear stress for the reactive mixture to preclude gel buildup in the die. The flow uniformity would be provided by the shape and dimensions of the manifold 92. This design would produce a die of moderate length even for wide polymer films and sheets.

While specific embodiments of the invention have been shown and described in detail to illustrate the application of the inventive principles, it will be understood to those skilled in the art that the invention may be embodied otherwise without departing from such principles.

What is claimed is:

1. An extrusion die for the continuous extrusion of a premixed reactive precursor mixture having an increasing viscosity over time, comprising:
    (a) a die inlet for receiving the premixed reactive precursor mixture from a source of premixed reactive precursor mixture;
    (b) spreader means in flow communication with said die inlet for spreading the reactive precursor mixture through the die, said spreader means having at least one channel, said channel having dimensions which produce a wall shear stress value for the increasingly viscous reactive precursor mixture being extruded which exceeds the critical wall shear stress value for the reactive precursor mixture such that the viscosity of a substantial portion of the reactive precursor mixture does not increase to the gel point for the mixture within the die; substantially even flow rate of the reactive precursor mixture through the die is maintained; and occlusion of said channel is avoided; and
    (c) an outlet means connected in flow communication to said spreader means for extruding the reactive precursor mixture onto a substrate said outlet means having dimensions which will produce a wall shear stress value for the increasingly viscous reactive precursor mixture exceeding the critical wall shear stress value for the reactive precursor mixture such that the viscosity of a substantial portion of the reactive precursor mixture does not increase to the gel point for the mixture within the die; flow of the reactive precursor mixture through the die is maintained; and occlusion of said outlet means is avoided.

2. The extrusion die of claim 1, further comprising a connecting nozzle in flow communication with the die inlet, the nozzle mounted intermediate the spreader means and the reactive precursor mixture source, the connecting nozzle having a passageway providing a smooth transition from the reactive precursor mixture source to the extrusion die inlet for the reactive precursor mixture flow, and the passageway of the connecting nozzle converging from a large diameter for receiving the reactive precursor mixture to a narrow diameter end in flow communication with the die inlet.

3. An extrusion die according to claim 2, wherein the reactive precursor mixture is received into the connecting nozzle under turbulent flow.

4. The extrusion die of claim 1, wherein said spreader means comprises:
    a plurality of channels, the channels forming a tree-like structure, said tree-like structure having a central channel in flow communication with the die inlet, a first branch stage having a plurality of branch channels splitting from the central channel, the splitting angle of the branch channels from the preceding central channel falling in the range of 0 degrees to 60 degrees, the dimensions of each branch channel in the first branch stage producing a wall shear stress value that exceeds the critical wall shear stress value for the reactive precursor mixture, and the length of the branch channels is such that the flow of the reactive precursor mixture proceeds toward the outlet means without favoring any of the branch channels over any of the other branch channels in the first branch stage.

5. The extrusion die of claim 4 wherein said tree-like structure further comprises a second branch stage, the second branch stage having a plurality of secondary branch channels splitting from the secondary branch channels of the first branch stage, the splitting angle of the secondary branch channels falling in the range of 0 degrees to 60 degrees, the dimensions of each secondary branch channel producing a wall shear stress value which exceeds the critical wall shear stress value for the reactive precursor mixture, and, the length of the secondary branch channels are such that the flow of the reactive precursor mixture proceeds toward the outlet means without the flow favoring any of the secondary branch channels over any of the other secondary branch channels.

6. The extrusion die of claim 5 wherein said tree-like structure further comprises a third branch stage, the third branch stage having a plurality of tertiary branch channels splitting off from the secondary branch channels, the splitting angle of the tertiary branch channels from the secondary branch channels falling in the range of 0 degrees to 60 degrees, the dimensions of each tertiary branch channel producing a wall shear stress value which exceeds the critical wall shear stress value for the reactive precursor mixture, and the length of the tertiary branch channels is such that the flow of the reactive precursor mixture proceeds toward the outlet means without favoring any of the tertiary branch channels over any of the other tertiary branch channels.

7. The extrusion die of claim 6, wherein the splitting angle is generally 30°.

8. The extrusion die of claim 6, wherein said first branch stage has two branch channels; said secondary branch stage has four secondary branch channels and said third branch stage has eight tertiary branch channels.

9. The extrusion die of claim 8 wherein the channels of the tree-like structure have the following dimensions:
(a) the cubed radius of the central channel is $3.05 \times 10^{-5}$ inches$^3$;
(b) the cubed radius of the branch channels of the first branch stage is $1.29 \times 10^{-5}$ inches$^3$;
(c) the cubed radius of the secondary branch channels of the second branch stage is $0.38 \times 10^{-5}$ inches$^3$; and
(d) the cubed radius of the tertiary branch channels of the third branch stage is $0.20 \times 10^{-5}$ x inches $^3$.

10. The extrusion die of claim 4, wherein said tree-like structure further comprises a plurality of branch stages, each branch stage having a plurality of branch channels splitting from the preceding channel, the splitting angle of the branch channels of each stage from the preceding channels falling in the range of 0 degrees to 60 degrees, the dimensions of each branch channel producing a wall shear stress that exceeds the critical wall shear stress value for the reactive precursor mixture, and the length of the branch channels are such that the flow of the reactive precursor mixture proceeds toward the outlet means without favoring any of the branch channels over any of the other branch channels in the same branch stage.

11. The extrusion die of claim 6, wherein the reactive precursor mixture in each branch channel produces a wall shear stress value, $\tau_i$, this wall shear stress value exceeding a critical wall shear stress value for the reactive precursor mixture, $\tau_c$, as shown in the formula:

$$\tau_i = \frac{4 \eta Q}{\pi 2^{i-1} R_i^3} > \tau_c = \frac{4 \eta Q}{\pi 2^{i-1} R_c^3}$$

where
Q is the total flow rate through the die,
i represents the number of branch channels,
$\eta$ equals the viscosity of the reactive precursor mixture, such that occlusion of the branch channels is prevented and flow of the reactive precursor mixture through the die is maintained.

12. The extrusion die of claim 8 wherein the length of the branch channels in each branch stage is defined by an arc length, $L_i$, such that when the number of branch channels is two in a branch stage, the arc length is represented by the formula:

$$L_i = 4R_i + \frac{\alpha\, 2^{n-i} \Delta w}{2(1 - \cos \alpha)}$$

where
$R_i$ represents the radius of the branch channel in its branch stage,
$\alpha$ equals the splitting angle of the branch channels from the preceding channel,
$\Delta w$ is the distance interval between two adjacent emerging reactive precursor mixture streams travelling from the tree-like structure to the outlet means,
i represents the branch stage for which the arc length is being calculated, and
n equals the total number of branch stages in the tree-like structure.

13. The extrusion die of claim 6, wherein said spreader means further comprises an upper spreader die member and a lower spreader die member, the upper and lower spreader die members longitudinally dividing the tree-like structure generally in half so that each die member bears generally one-half of the tree-like structure; and means for holding the upper spreader die member to the lower spreader die member such that the divided branch channels are in fluid-tight alignment to form the complete channels of the tree-like structure.

14. The extrusion die of claim 1, wherein said outlet means comprises a detachable slit section, said slit section having an upper extrusion lip mounted on the upper spreader die member, the upper extrusion lip having a plurality of delivery tapers and an upper extrusion face; a lower extrusion lip mounted on the lower spreader die member, the lower extrusion lip having a plurality of delivery tapers and a lower extrusion face, such that the upper and lower extrusion die lips define an extrusion slit gap when the die is assembled, the height of the slit gap producing a wall shear stress value for the reactive precursor mixture which exceeds a critical wall shear stress value for the reactive precursor mixture so that the reactive precursor mixture does not accumulate in the slit gap, and the delivery tapers of the upper and lower extrusion lips are tightly aligned with the ends of the branch channels of the branch stage to provide a smooth flow communication transition from the spreader means to the slit section.

15. The extrusion die of claim 14, wherein the slit gap of the outlet means in cooperation with the reactive precursor mixture produces a wall shear stress value for the reactive precursor mixture, $\tau_{gap}$, which exceeds a critical wall sheer stress value for the reactive precursor mixture, as shown in the following formula assuming that the reactive precursor mixture behaves like a Newtonian fluid:

$$\tau_{gap} = \frac{6 \eta Q}{W B_{gap}^2} > \tau_c \frac{6 \eta Q}{W B_c^2}$$

where
- $\eta$ represents the viscosity of the reactive precursor mixture,
- Q is the flow rate;
- W is the width of the produced coating,
- $B_{gap}$ is the height of the slit gap; and
- $B_c$ is the critical height of the slit gap at which the reactive precursor mixture will not accumulate at the walls of the slit gap.

16. The extrusion die of claim 1, wherein the average length of time which the reactive precursor mixture resides in the die is less than the gel time of the reactive precursor mixture and there is a uniform distribution of residence time for the mixture across the width of the die.

17. The extrusion die of claim 1, wherein the die is constructed from a chemical, thermal and pressure resistance material.

18. A method for determining the critical wall shear stress value for a premixed reactive precursor mixture, comprising the steps of:
   (a) selecting components for a reactive precursor mixture;
   (b) mixing the components to form the premixed reactive precursor mixture;
   (c) dispensing the reactive precursor mixture through a generally cylindrical calibrating die, the reactive precursor mixture travelling at a fixed flow rate;
   (d) monitoring the pressure drop of the reactive polymer precursor mixture as it travels through the die as a function of time until a steady state flow is achieved, said steady state flow generally representing the point at which there is no further significant gel buildup in the die;
   (e) measuring the radius of the passageway in the die after a steady state flow is achieved, said radius representing the critical radius at which there is generally no further measurable gel buildup; and,
   (f) calculating the critical wall shear stress value from the critical radius according to the formula:

$$\tau_c = \frac{4 \eta Q}{\pi 2^{i-1} R_c^3}$$

where
- Q is the total flow rate through the die,
- i represents the number of branch channels,
- $\eta$ equals the viscosity of the reactive precursor mixture, such that occlusion of the branch channels is prevented and flow of the reactive precursor mixture through the die is maintained.

19. The method of claim 18, wherein the reactive precursor mixture is an activated, multi-component cross-linking polyurethane system.

20. The method of claim 19, wherein the activated polyurethane system comprises uretonimine modified methanediisocyanate and a triol of intermediate molecular weight.

21. The method of claim 20, wherein the polyurethane system is activated by dibutyltindilaurate.

22. The method of claim 20, wherein the uretonimine modified methanediisocyanate is 4-4' diphenylmethanediisocyanate.

23. An extrusion die for extruding a polymer from a premixed reactive precursor mixture comprising:
   a coat hanger die, the coat hanger die having a main branch for receiving the incoming reactive precursor mixture, a tapering distribution branch, the distribution branch in flow communication with the main branch, generally conforming to the external shape of the die, and a plurality of generally straight discharge branches in flow communication with the distribution branch, the radii of the discharge branches producing a wall shear stress value exceeding the critical wall shear stress value for the premixed reactive precursor mixture, such that occlusion of said branches is avoided and flow of the reactive precursor mixture through the die is maintained; and
   the die having a discharge end connected to the discharge channels for extruding the polymer.

24. A method for the continuous extrusion of a premixed reactive precusor mixture having an increasing viscosity over time, comprising:
   (a) selecting components for a premixed reactive precursor mixture;
   (b) mixing the components to form a premixed reactive precursor mixture;
   (c) introducing a flow of the premixed reactive precursor mixture into an inlet of an extrusion die, said extrusion die having at least one channel, the channel in flow communication with the inlet for conducting the flow of the premixed reactive precursor mixture through the die, said channel having dimensions which produce a wall shear stress value for the increasingly viscous reactive precursor mixture being extruded which exceeds the critical wall shear stress value for the premixed reactive precursor mixture; and
   (d) extruding the premixed reactive precursor mixture through an extrusion outlet means of the die, such that the viscosity of a substantial portion of the reactive precursor mixture does not increase to the gel point for the mixture within the die; the occlusion of the die is avoided; and flow of the reactive precursor mixture thereof the die is substantially maintained.

25. The method of claim 24 wherein step (b) includes impingement mixing of the components and step (c) includes introducing an initially turbulent flow of the premixed reactive precursor mixture into the die.

26. The method of claim 24 where the reactive precursor mixture is extruded onto a substrate which is traveling with respect to the position of the extrusion outlet means.

27. The method of claim 24 wherein the critical wall shear stress value for the premixed reactive precursor mixture is determined according to the formula $$\tau_i = \frac{4 \eta Q}{\pi 2^{i-1} R_i^3} > \tau_c = \frac{4 \eta Q}{\pi 2^{i-1} R_c^3}$$

where

Q is the total flow rate through the die, i represents the number of branch channels, $\eta$ equals the viscosity of the reactive precursor mixture, such that occlusion of the branch channels is prevented and flow of the reactive precursor mixture through the die is maintained.

28. The method of claim 24 wherein the premixed reactive precursor mixture is an activated multi-component crosslinking polyurethane precursor system.

29. The method of claim 28 wherein the activated polyurethane precursor system comprises uretonimine modified methanediisocyanate and a triol of intermediate molecular weight.

30. The method of claim 28, wherein the polyurethane precursor system is activated by dibutyltindilaurate.

31. The method of claim 29, wherein the uretonimine modified methanediisocyanate is 4-4' diphenylmethanediisocyanate.

32. An extrusion die according to claim 1, wherein the critical wall shear stress value is determined according to the formula:

$$\tau_i = \frac{4\eta Q}{\pi 2^{i-1} R_i^3} > \tau_c = \frac{4\eta Q}{\pi 2^{i-1} R_c^3}$$

where

Q is the total flow rate through the die, i represents the number of branch channels, $\eta$ equals the viscosity of the reactive precursor mixture assuming no significant viscosity rise due to the polymerization of the reactive precursor mixture, and assuming that the reactive precursor mixture behaves like a Newtonian fluid, such that occlusion of the branch channels is prevented and flow of the reactive precursor mixture through the die is maintained.

33. An extrusion die for the continuous extrusion of a premixed reactive precursor mixture having an increasing viscosity over time, comprising:
 (a) a die inlet for receiving a flow of the premixed reactive precursor mixture traveling at a constant flow rate;
 (b) at least one generally cylindrical channel in flow communication with the inlet for conducting the flow of the premixed reactive precursor mixture through the die, said cylindrical channel having a critical channel radius which produces a wall shear stress value for the increasingly viscous reactive precursor mixture being extruded which exceeds the critical wall shear stress value for the premixed reactive precursor mixture; and
 (c) a die extrusion outlet means for extruding the premixed reactive precursor mixture, such that the viscosity of a substantial portion of the reactive precursor mixture does not increase to the gel point for the mixture within the die, occlusion of the die is avoided and flow of the premixed reactive precursor mixture through the die is substantially maintained.

34. An extrusion die according to claim 33, further comprising a nozzle in flow communication with the die inlet, the nozzle having a passageway which converges from a large diameter end for receiving the premixed reactive precursor mixture to a narrow diameter end in flow communication with the die inlet and the premixed reactive precursor mixture is received into the nozzle under turbulent flow.

35. An extrusion die according to claim 10 wherein said branch channels have a generally circular cross-section throughout.

* * * * *